United States Patent
Cunha et al.

(10) Patent No.: US 10,612,781 B2
(45) Date of Patent: Apr. 7, 2020

(54) COMBUSTOR WALL APERTURE BODY WITH COOLING CIRCUIT

(71) Applicant: United Technologies Corporation, Hartford, CT (US)

(72) Inventors: Frank J. Cunha, Avon, CT (US); Stanislav Kostka, Middletown, CT (US)

(73) Assignee: United Technologies Corporation, Farmington, CT (US)

(*) Notice: Subject to any disclaimer, the term of this patent is extended or adjusted under 35 U.S.C. 154(b) by 745 days.

(21) Appl. No.: 14/935,128

(22) Filed: Nov. 6, 2015

(65) Prior Publication Data

US 2016/0131363 A1     May 12, 2016

Related U.S. Application Data (60) Provisional application No. 62/076,889, filed on Nov. 7, 2014.

(51) Int. Cl.
| | | |
|---|---|---|
| *F23R 3/04* | (2006.01) | |
| *F23R 3/06* | (2006.01) | |
| *F23R 3/50* | (2006.01) | |
| *F16C 29/02* | (2006.01) | |
| *F23R 3/00* | (2006.01) | |

(52) U.S. Cl.
CPC ............... *F23R 3/04* (2013.01); *F16C 29/02* (2013.01); *F23R 3/002* (2013.01); *F23R 3/045* (2013.01); *F23R 3/06* (2013.01); *F23R 3/50* (2013.01); *F16C 2360/23* (2013.01); *F23R 2900/03044* (2013.01); *F23R 2900/03045* (2013.01)

(58) Field of Classification Search
CPC .... F02C 7/12; F02C 7/143; F02C 7/18; F23R 3/04; F23R 3/045; F23R 3/06; F23R 3/002; F23R 2900/03043; F23R 2900/03044; F23R 2900/03045
See application file for complete search history.

(56) References Cited

U.S. PATENT DOCUMENTS

| | | | |
|---|---|---|---|
| 4,132,066 A | 1/1979 | Austin et al. | |
| 4,622,821 A | 11/1986 | Madden | |
| 4,653,279 A | 3/1987 | Reynolds | |
| 5,353,865 A * | 10/1994 | Adiutori ................ | F28F 13/02 165/109.1 |
| 6,557,350 B2 * | 5/2003 | Farmer ................... | F23R 3/283 60/39.821 |

(Continued)

FOREIGN PATENT DOCUMENTS

| | | |
|---|---|---|
| GB | 2353589 | 2/2001 |
| WO | 2015085065 | 6/2015 |

OTHER PUBLICATIONS

EP search report for EP15193737 dated Mar. 14, 2016.

*Primary Examiner* — Ehud Gartenberg
*Assistant Examiner* — James P McGlynn
(74) *Attorney, Agent, or Firm* — O'Shea Getz P.C.

(57) ABSTRACT

An assembly for a turbine engine is provided that includes a combustor wall, which includes an aperture body between a shell and a heat shield. The aperture body at least partially forms a cavity and an aperture that extends through the combustor wall. An inlet passage extends in the combustor wall to the cavity. An outlet passage extends in the combustor wall from the cavity to the aperture.

18 Claims, 6 Drawing Sheets

(56) References Cited

U.S. PATENT DOCUMENTS

| | | | |
|---|---|---|---|
| 7,000,396 B1 | 2/2006 | Storey | |
| 7,631,502 B2 | 12/2009 | Burd | |
| 9,140,452 B2 * | 9/2015 | Reiss | F23R 3/14 |
| 9,803,863 B2 * | 10/2017 | Johnson | F23R 3/002 |
| 2004/0104538 A1 | 6/2004 | Pidcock et al. | |
| 2010/0186416 A1 | 7/2010 | Chen et al. | |
| 2010/0212324 A1 * | 8/2010 | Bronson | F02C 7/264 |
| | | | 60/752 |
| 2010/0287941 A1 | 12/2010 | Won-Wook | |
| 2013/0340437 A1 | 6/2013 | Erbas-Sen | |
| 2013/0239575 A1 | 9/2013 | Chen et al. | |
| 2013/0255269 A1 * | 10/2013 | McKenzie | F23R 3/007 |
| | | | 60/772 |
| 2013/0272882 A1 * | 10/2013 | Mittendorf | F01D 5/04 |
| | | | 416/175 |
| 2014/0083112 A1 * | 3/2014 | Jause | F23R 3/002 |
| | | | 60/782 |
| 2014/0137568 A1 | 5/2014 | Bunel et al. | |

* cited by examiner

COMBUSTOR WALL APERTURE BODY WITH COOLING CIRCUIT

This application claims priority to U.S. Patent Appln. No. 62/076,889 filed Nov. 7, 2014, which application is hereby incorporated by reference in its entirety.

BACKGROUND OF THE INVENTION

1. Technical Field

This disclosure relates generally to a turbine engine and, more particularly, to a combustor for a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall may include a shell and a heat shield, which heat shield forms a respective radial side of a combustion chamber. Cooling cavities extend radially between the heat shield and the shell. These cooling cavities may fluidly couple impingement apertures in the shell with effusion apertures in the heat shield.

Each combustor wall may also include a plurality of quench aperture grommets located between the shell and the heat shield. Each of the quench aperture grommets thin's a quench aperture radially through the respective combustor wall. The quench aperture grommets as well as adjacent portions of the heat shield are typically subject to relatively high temperatures during turbine engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall which includes an aperture body between a shell and a heat shield. The aperture body at least partially forms a cavity and an aperture that extends through the combustor wall. An inlet passage extends in the combustor wall to the cavity. An outlet passage extends in the combustor wall from the cavity to the aperture.

According to another aspect of the invention, a combustor wall is provided for a turbine engine. This combustor wall includes a shell, a heat shield and an aperture body axially between the shell and the heat shield. The aperture body at least partially forms a quench aperture that extends axially through the combustor wall. An inlet passage extends axially in the aperture body to an impingement cavity at least partially formed in the aperture body. An outlet passage extends radially in the aperture body from the impingement cavity to the quench aperture.

According to still another aspect of the invention, a grommet is provided for a turbine engine combustor wall through which a quench aperture extends along an axis. The grommet includes an annular aperture body that extends axially between first and second surfaces and radially between inner and outer surfaces. The inner surface at least partially forms the quench aperture. A cavity is formed at least partially within the aperture body. An inlet passage extends axially in the aperture body from an inlet orifice in the first surface to the cavity. An outlet passage extends radially in the aperture body from the cavity to an outlet orifice in the inner surface.

The aperture body may be configured with a generally c-channeled sectional geometry.

The aperture may be configured as a quench aperture.

The combustor wall may be configured to direct air through the inlet passage to impinge against a surface forming a side of the cavity. The surface may (or may not) be textured to augment convective heat transfer between the air and the combustor wall.

One or more heat transfer augmentors may be included and extend into the cavity.

The aperture may extend along an axis through the combustor wall. The inlet passage may extend axially to the cavity. The outlet passage may also or alternatively extend radially from the cavity to the aperture.

The inlet passage may be one of a plurality of inlet passages that extend in the combustor wall to the cavity. In addition or alternatively, the outlet passage may be one of a plurality of outlet passages that extend in the combustor wall from the cavity to the aperture.

The cavity may include or be configured as an annular cavity. Alternatively, the cavity may include or be configured as a semi-annular (e.g., arcuate) cavity or have various other configurations.

The aperture body may at least partially form a second cavity. A second inlet passage may extend in the combustor wall to the second cavity. A second outlet passage may extend in the combustor wall from the second cavity to the aperture.

The inlet passage may be within the aperture body. The outlet passage may also or alternatively be within the aperture body.

The aperture may be partially formed by an inner surface and a shelf surface that extends radially out to the inner surface. The outlet passage may extend to an outlet in the inner surface.

A gap may extend radially between the aperture body and the shell. A channel may extend axially into the aperture body and fluidly couple the gap with the inlet passage.

The aperture body may include a tapered flange that partially forms the aperture through the combustor wall.

The aperture body may be formed integral with the heat shield.

A second combustor wall and a combustor bulkhead may be included. The combustor wall may extend radially between the combustor wall and the second combustor wall. The combustor wall, the second combustor wall and the bulkhead may form an annular combustion chamber therebetween.

The foregoing features and the operation of the invention will become more apparent in light of the following description and the accompanying drawings.

DETAILED DESCRIPTION OF THE INVENTION

Figure 1:
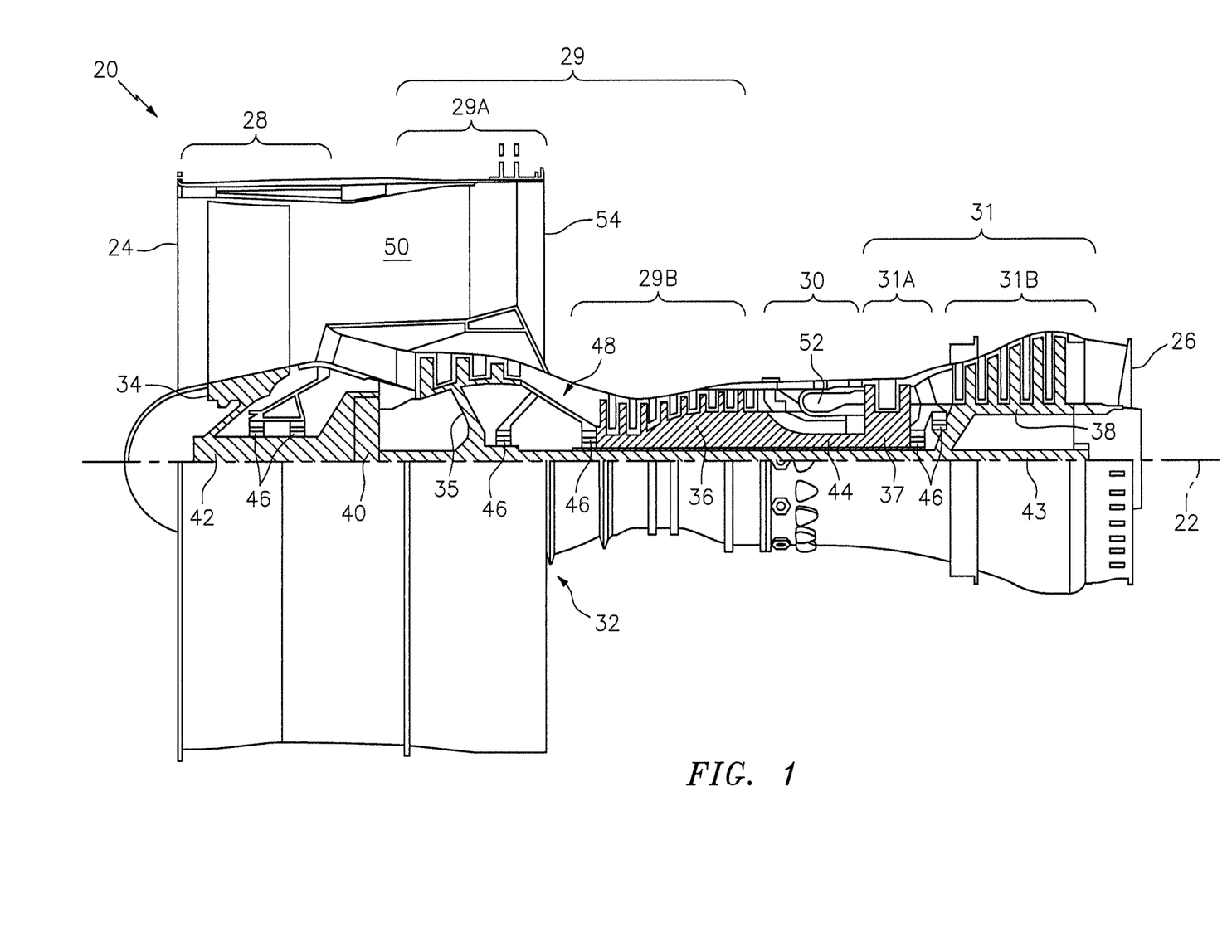
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the centerline 22 within an engine housing 32. Each of the engine sections 28, 29A, 29B, 31A and 31B includes a respective rotor 34-38. Each of these rotors 34-38 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 34 is connected to a gear train 40, for example, through a fan shaft 42. The gear train 40 and the LPC rotor 35 are connected to and driven by the LPT rotor 38 through a low speed shaft 43. The HPC rotor 36 is connected to and driven by the HPT rotor 37 through a high speed shaft 44. The shafts 42-44 are respectively rotatably supported by a plurality of bearings 46; e.g., rolling element and/or thrust bearings. Each of these bearings 46 may be connected to the engine housing 32 by at least one stationary structure such as, for example, an annular support strut.

During operation, air enters the turbine engine 20 through the airflow inlet 24, and is directed through the fan section 28 and into a core gas path 48 and a bypass gas path 50. The air within the core gas path 48 may be referred to as "core air". The air within the bypass gas path 50 may be referred to as "bypass air". The core air is directed through the engine sections 29-31, and exits the turbine engine 20 through the airflow exhaust 26 to provide forward engine thrust. Within the combustor section 30, fuel is injected into a (e.g., annular) combustion chamber 52 and mixed with the core air. This fuel-core air mixture is ignited to power the turbine engine 20. The bypass air is directed through the bypass gas path 50 and out of the turbine engine 20 through a bypass nozzle 54 to provide additional forward engine thrust which may account for the majority of the forward engine thrust. Alternatively, at least some of the bypass air may be directed out of the turbine engine 20 through a thrust reverser to provide reverse engine thrust.

Figure 2:
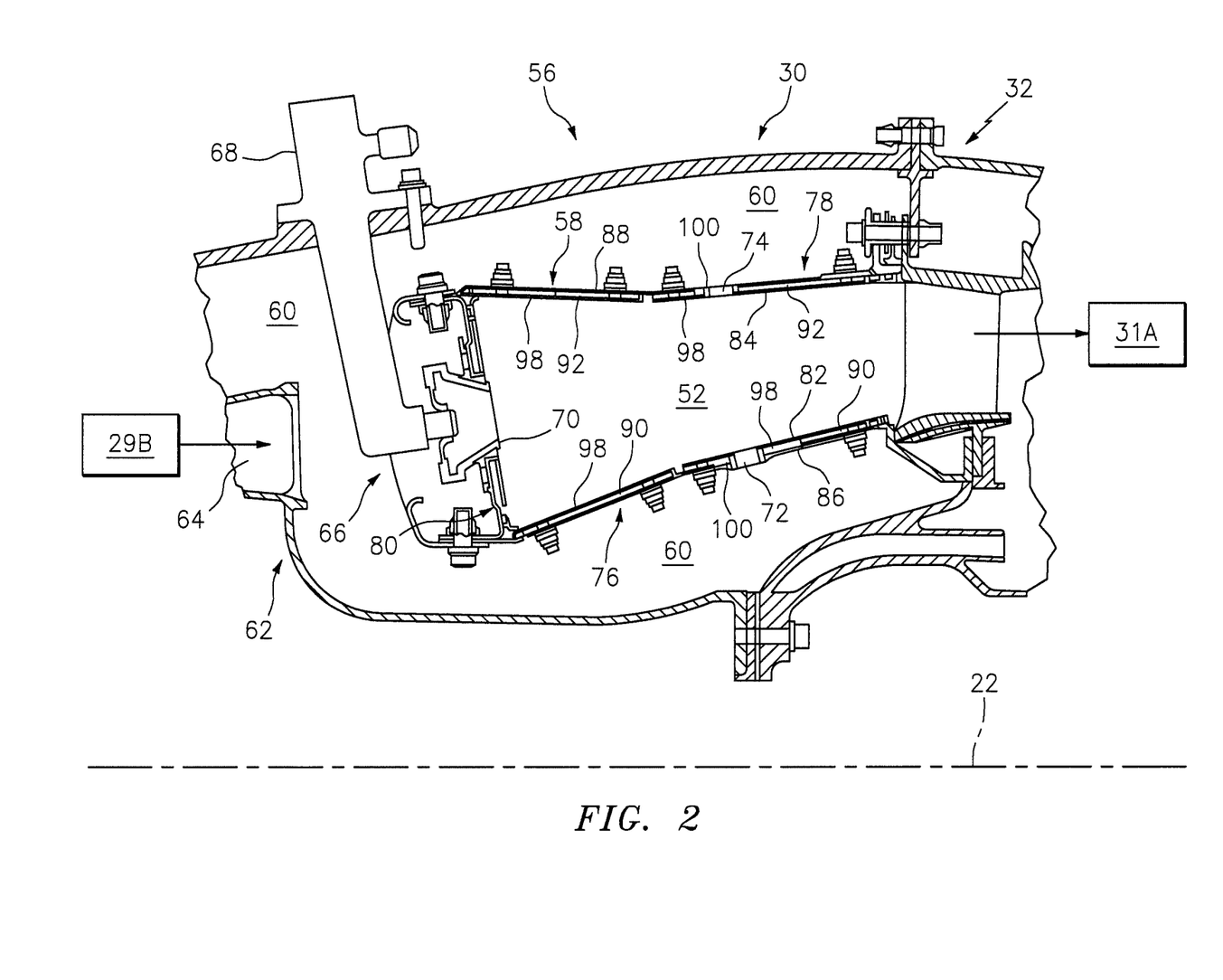
FIG. 2 is a partial side cutaway illustration of an assembly for the turbine engine of FIG. 1.

FIG. 2 illustrates an assembly 56 of the turbine engine 20 of FIG. 1. The turbine engine assembly 56 includes a combustor 58 arranged within a (e.g., annular) combustor plenum 60 of a diffuser module 62. The plenum 60 receives compressed core air from the HPC section 29B through an inlet passage 64 of the diffuser module 62. The plenum 60 provides the received core air to the combustor 58 as described below in further detail.

The turbine engine assembly 56 also includes one or more fuel injector assemblies 66 arranged circumferentially around the centerline 22. Each of these fuel injector assemblies 66 includes a fuel injector 68 which may be mated with a swirler 70. The fuel injector 68 injects the fuel into the combustion chamber 52. The swirler 70 directs some of the core air from the plenum 60 into the combustion chamber 52 in a manner that facilitates mixing the core air with the injected fuel. One or more igniters (not shown) ignite the fuel-core air mixture. Quench apertures 72 and 74 (see also FIG. 3) in inner and/or outer walls 76 and 78 of the combustor 58 may direct additional core air into the combustion chamber 52 for combustion. Additional core air may also be directed (e.g., effused) into the combustion chamber 52 through one or more cooling apertures (see FIG. 4) in the inner and the outer walls 76 and 78.

The combustor 58 may be configured as an annular floating wall combustor. The combustor 58 of FIG. 2, for example, includes an annular combustor bulkhead 80, the tubular combustor inner wall 76, and the tubular combustor outer wall 78. The bulkhead 80 extends radially between and is connected to the inner wall 76 and the outer wall 78. Each wall 76, 78 extends axially along the centerline 22 from the bulkhead 80 towards the HPT section 31A, thereby defining the combustion chamber 52.

Figure 4:
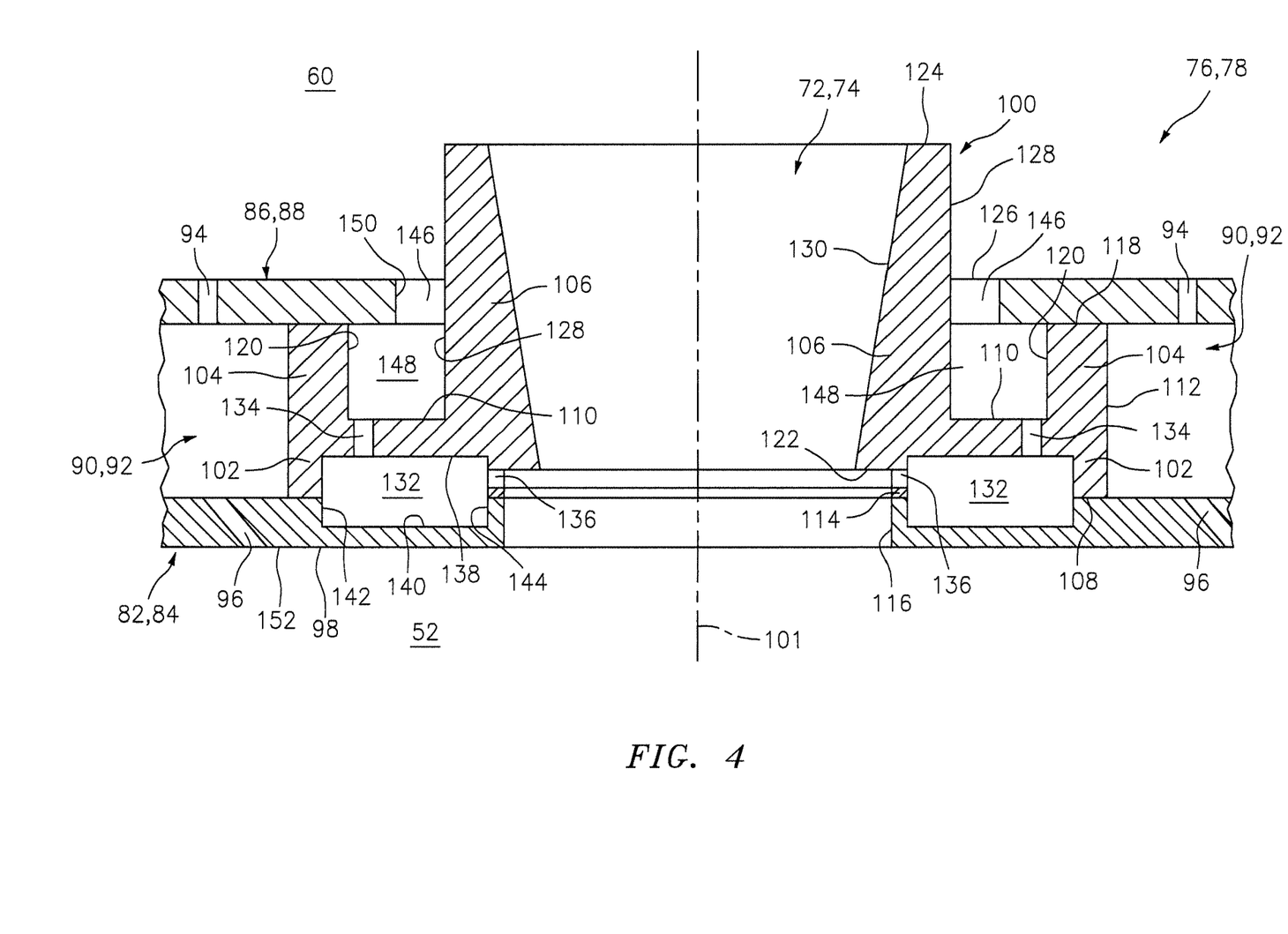
FIG. 4 is a partial sectional illustration of a combustor wall for the turbine engine assembly of FIG. 2.

Each combustor component 76, 78 and 80 may be a multi-walled structure that includes, for example, a heat shield (e.g., 82, 84) attached to a shell (86, 88). The inner and the outer walls 76 and 78, for example, each respectively include a heat shield 82, 84 connected to a shell 86, 88 with one or more cooling cavities 90, 92 (e.g., impingement cavities) between the shell 86, 88 and the heat shield 82, 84. Referring to FIG. 4, each of these cooling cavities 90, 92 may be fluidly coupled with the plenum 60 through one or more impingement apertures 94. Each cooling cavity 90, 92 may be fluidly coupled with the combustion chamber 52 through the one or more effusion apertures 96. The shell 86, 88 may be configured as a unitary full hoop body. The heat shield 82, 84 may include one or more circumferential arrays of heat shield panels 98. The present disclosure, however, is not limited to the foregoing multi-walled structure configuration.

Figure 3:
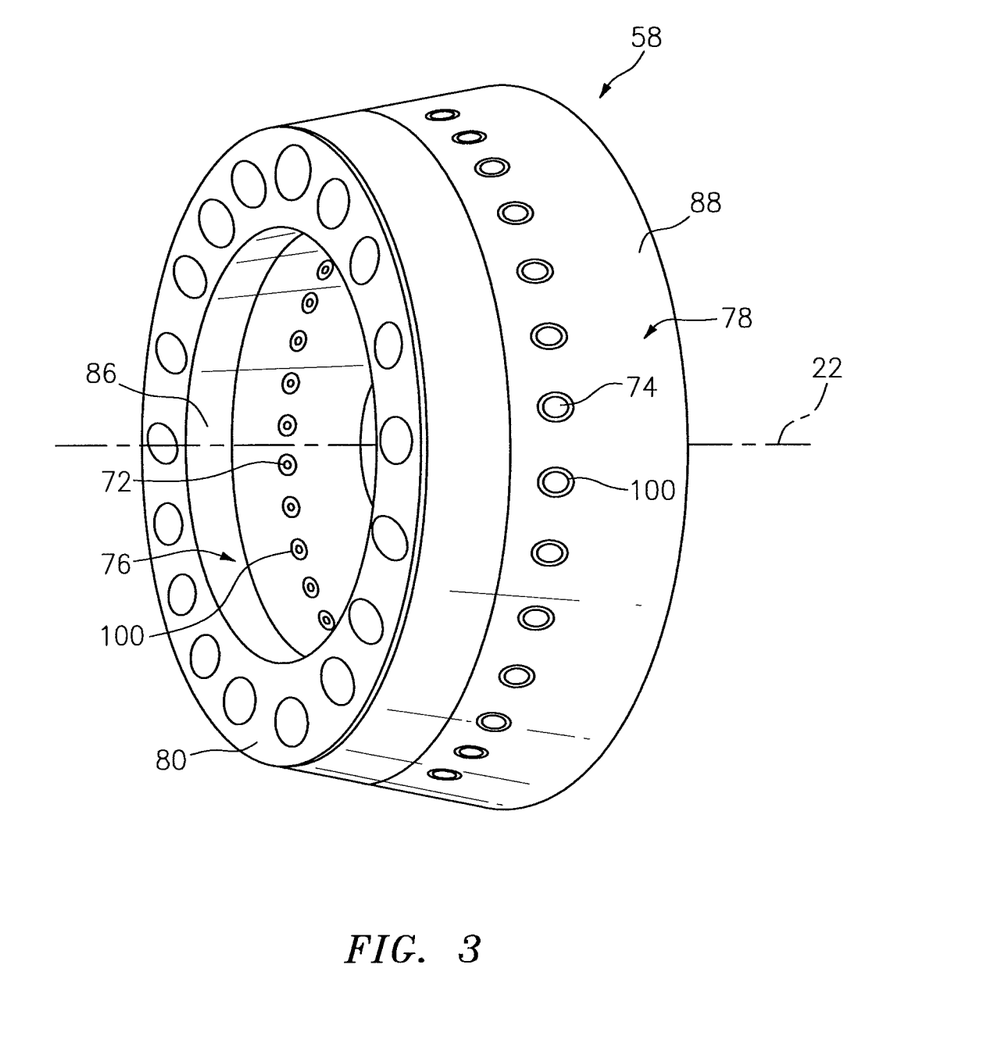
FIG. 3 is a perspective schematic illustration of a combustor for the turbine engine assembly of FIG. 2.

Referring to FIGS. 2-4, the inner and/or the outer walls 76 and 78 also each include one or more (e.g., annular) aperture bodies 100; e.g., grommets. Each of these aperture bodies 100 partially or completely forms a respective one of the quench apertures 72, 74 through the respective combustor wall 76, 78 along a respective axis 101 (see FIG. 4). The aperture bodies 100 are respectively disposed circumferentially around the centerline 22 between the shell 86, 88 and the heat shield 82, 84. Each of the aperture bodies 100, for example, may be located within and extend axially (relative to the axis 101) through a respective one of the cooling cavities 90, 92.

Referring to FIG. 4, each aperture body 100 may be formed integral with or attached to the heat shield 82, 84. Each aperture body 100, for example, may be fastened, bonded (e.g., welded, brazed, adhered, etc.) and/or otherwise attached to a respective one of the heat shield panels 98. Alternatively or additionally, one or more of the aperture bodies 100 may each be formed integral with or attached to the shell 86, 88.

The aperture body 100 may have a generally c-channeled sectional geometry. The aperture body 100 of FIG. 4, for example, includes a base 102 integrally formed with one or more flanges 104 and 106. The base 102 extends axially (relative to the axis 101) between opposing surfaces 108 and 110. The base 102 extends radially (relative to the axis 101) between an outer surface 112 and an inner surface 114, which may be substantially aligned with a surface 116 extending axially through the heat shield 82, 84. The outer flange 104 extends axially (relative to the axis 101) from the base 102 to a distal end surface 118, which may sealingly engage (e.g., contact) the shell 86, 88. The outer flange 104 extends radially (relative to the axis 101) between the outer surface 112 and another inner surface 120. The inner flange 106 extends axially (relative to the axis 101) from the base 102 and a shelf surface 122 to a distal end surface 124, and may project axially through an aperture 126 in the shell 86, 88. The inner flange 106 extends radially (relative to the axis 101) between another outer surface 128 and another inner surface 130. This inner surface 130 may be (acutely) angled relative to the axis 101 and thereby provide the flange 106 with a taper towards its distal end surface 124. The shelf surface 122 extends radially (relative to the axis 101) between the inner surfaces 114 and 130 thereby forming a shelf in the aperture body 100. The surfaces 114, 116, 122 and 130 cooperate with one another and form the respective quench aperture 72, 74 through the combustor wall 76, 78.

Figure 5:
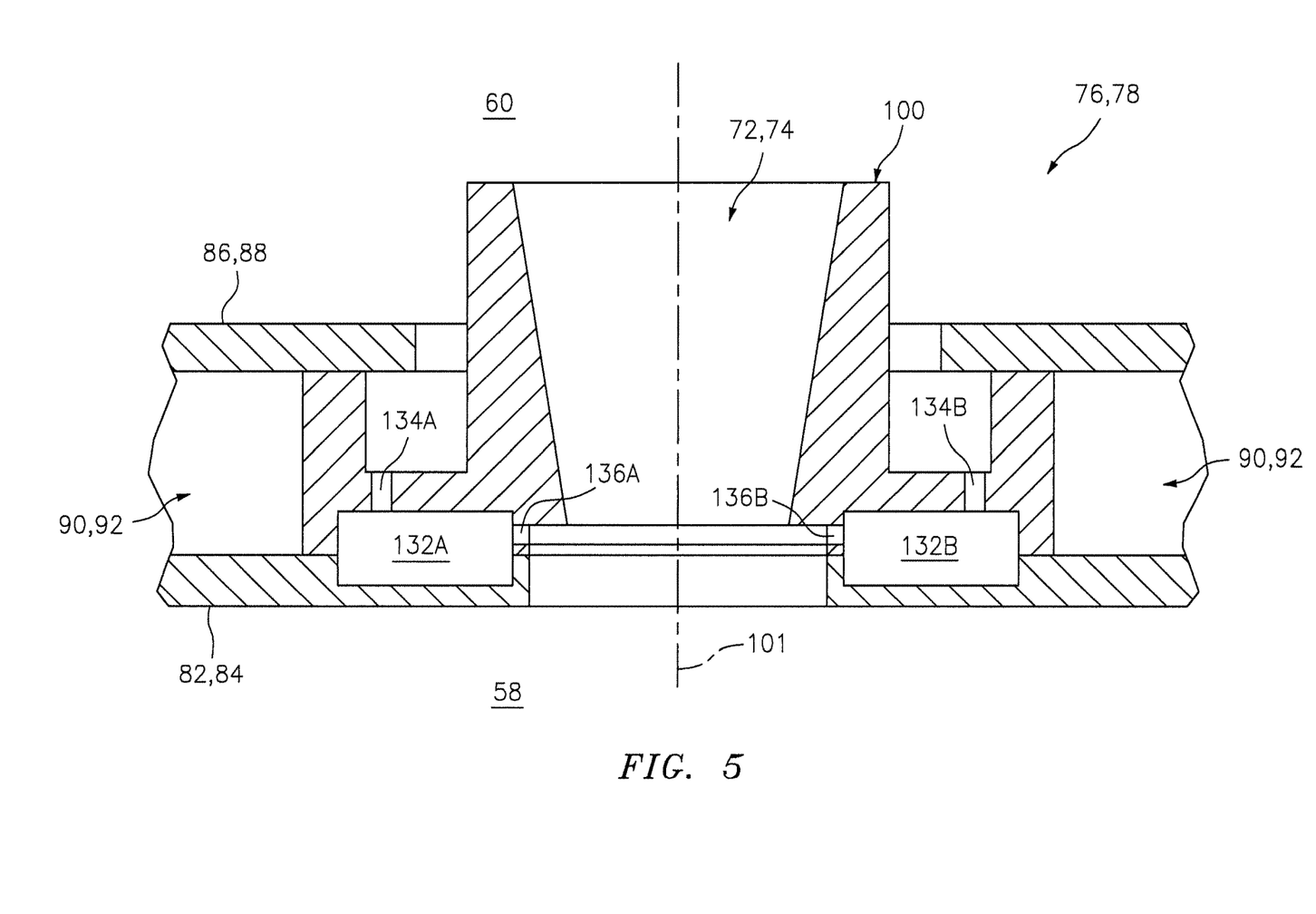
FIG. 5 is a partial sectional illustration of an alternative combustor wall for the turbine engine assembly of FIG. 2.

Each aperture body 100 also includes or at least partially forms at least one internal cavity 132, one or more inlet passages 134 and one or more outlet passages 136. The cavity 132 of FIG. 4, for example, extends axially (relative to the axis 101) between surfaces 138 and 140. The surface 138 may be axially recessed into the aperture body 100; e.g., the base 102. The surface 140 may be axially recessed into the heat shield 82, 84. The cavity 132 extends radially (relative to the axis 101) between an outer end 142 and an inner end 144. The outer end 142 and/or the inner end 144 may each be formed by the aperture body 100 and/or the heat shield 82, 84. The cavity 132 may be annular and extend circumferentially completely around the axis 101. Alternatively, the cavity 132 may extend laterally; e.g., circumferentially partially around the axis 101. In such alternative embodiments, two or more of these cavities (e.g., 132A and 132B) may be arranged about the axis 101 and fluidly coupled between respective passages 134A, B and 136A, B as shown in FIG. 5.

Referring again to FIG. 4, each inlet passage 134 extends radially in the combustor wall 76, 78 and, more particularly, the base 102 from an inlet orifice in the surface 110 to the cavity 132. Each inlet passage 134 may be located at (e.g., on, adjacent or proximate) the outer end 142, and is configured to direct air from the plenum 60 to impinge against the surface 140.

Each outlet passage 136 extends axially in the combustor wall 76, 78 and, more particularly, the base 102 from the cavity 132 to an outlet orifice in the surface 114 and, thus, the quench aperture 72, 74. Each outlet passage 136 may be located at the surface 138. In alternative embodiments, however, one or more of the outlet passages 136 may be formed in cooperation with the heat shield 82, 84 or extend within the heat shield 82, 84.

The aperture body 100 may also include or at least partially form a (e.g., annular) gap 146 and a (e.g., an annular) channel 148. The gap 146 extends radially (relative to the axis 101) between the surfaces 128 and 150. The channel 148 extends axially (relative to the axis 101) into the aperture body 100 to the surface 110. The channel 148 extends radially (relative to the axis 101) within the aperture body 100 between the surfaces 120 and 128. In this manner, the channel 148 fluidly couples the gap 146 and, thus, the plenum 60 to the inlet passages 134. It is worth noting, the gap 146 and/or the channel 148 may be sized such that gas pressure within the channel 148 is substantially equal to gas pressure within the plenum 60. However, the present disclosure is not limited thereto; e.g., the gas pressure within the plenum 60 may be higher than the gas pressure within the channel 148.

During operation, core air from the plenum 60 is directed into the cavity 132 through the inlet passages 134. This core air (cooling air) may impinge against the heat shield 82, 84 and its surface 140, thereby impingement cooling a region of the heat shield 82, 84 under the aperture body 100. The cooling air within the cavity 132 is subsequently directed through the outlet passages 136 into quench aperture 72, 74 and thereafter the combustion chamber 52. Within the cavity 132 and each passage 134, 136, the cooling air may also cool the heat shield 82, 84 and/or the aperture body 100 through convective heat transfer. In this manner, the cavity 132 in cooperation with the passages 134 and 136 may cool a region of the combustor wall 76, 78 between the aperture body 100 and the heat shield 82, 84 and thereby reduce thermal stresses within this region. Furthermore, by directing the cooling air into the quench aperture 72, 74 rather than as a film against a combustion chamber surface 152 of the heat shield 82, 84, cooling film ingestion into the quench aperture 72, 74 may be reduced or eliminated.

Figure 6:
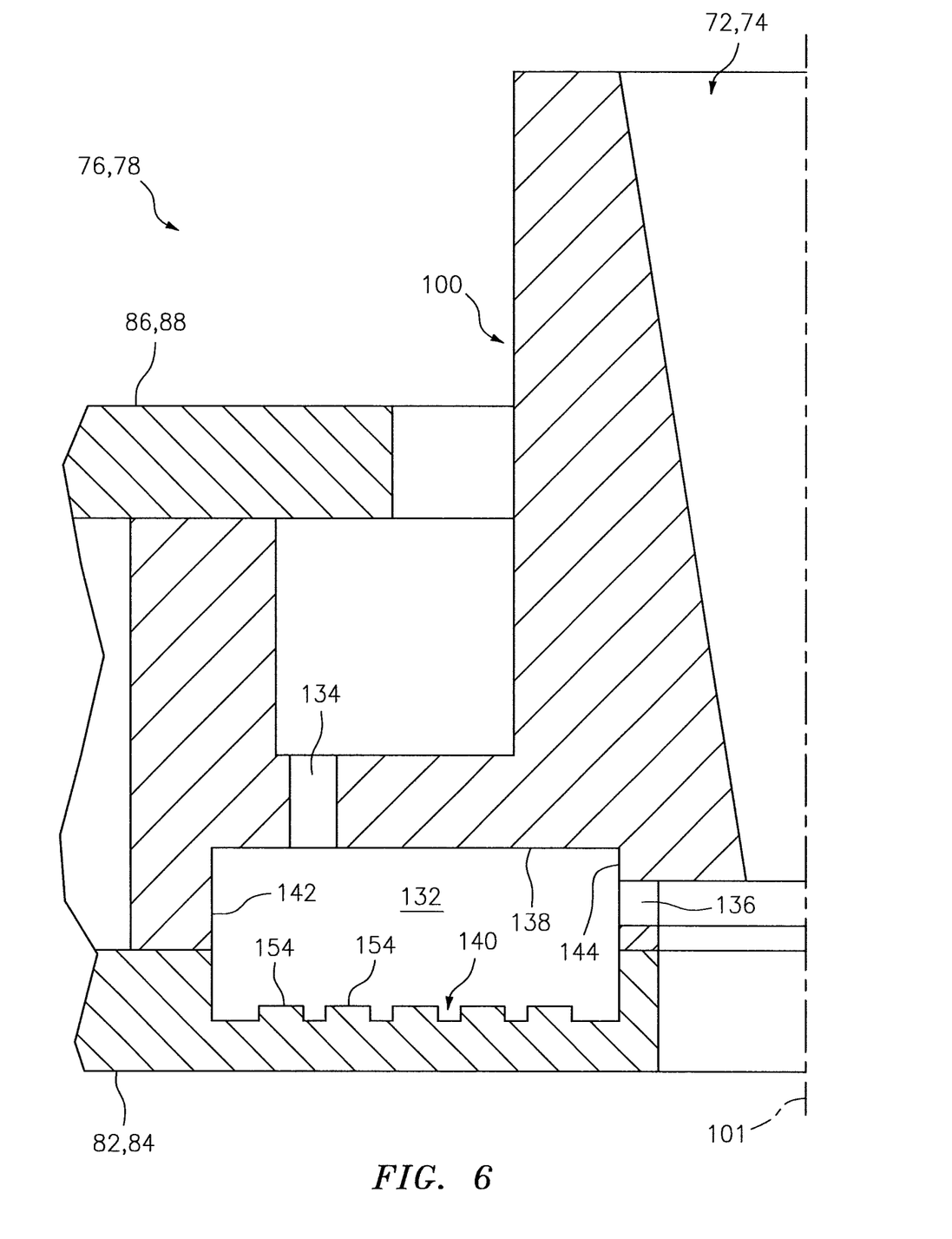
FIG. 6 is a partial sectional illustration of another alternative combustor wall for the turbine engine assembly of FIG. 2.

In some embodiments, referring to FIG. 6, the surface 140 may be textured to augment convective heat transfer between the cooling air within the cavity 132 and the combustor wall 76, 78. For example, the combustor wall 76, 78 (e.g., the heat shield 82, 84) may include one or more heat transfer augmentors 154 that project axially into the cavity 132. One or more of these augmentors 154 may be configured to turbulate the cooling air within the cavity 132. Examples of suitable augmentors 154 include, but are not limited to, trip strips (e.g., chevrons, linear, etc. trip strips), pins, pedestals, etc.

One or more of the aperture bodies 100 may each have a configuration other than those described above. For example, one or more of the aperture body 100 surfaces may have a circular cross-section. Alternatively, one or more of these surfaces may each have a non-circular cross-section. Examples of a non-circular cross-section include, but are not limited to, an oval cross-section, an elliptical cross-section, a pear-shaped cross-section, a teardrop cross-section, a polygonal (e.g., rectangular, triangular, etc.) cross-section, or any other symmetric or asymmetric shaped cross-section with, for example, its major axis 101 aligned (e.g., parallel) with the centerline 22.

In some embodiments, one or more of the aperture bodies 100 may each be formed as a unitary body. Each aperture body 100, for example, may be cast or additively manufactured as a single unit and/or machined from a single billet of material. Alternatively, one or more of the aperture bodies 100 may each be configured with a plurality of discrete annular body segments that are attached (e.g., bonded and/or mechanically fastened) to one another.

In some embodiments, one or more of the aperture bodies 100 may alternatively be configured to form other types of apertures through one or more of the combustor walls 82, 84. For example, at least one of the aperture bodies 100 may define an aperture that receives an igniter. In another example, at least one of the aperture bodies 100 may define an aperture that may receive a borescope during combustor 58 maintenance and/or inspection.

The turbine engine assembly 56 may be included in various turbine engines other than the one described above. The turbine engine assembly 56, for example, may be included in a geared turbine engine where a gear train connects one or more shafts to one or more rotors in a fan section, a compressor section and/or any other engine section. Alternatively, the turbine engine assembly 56 may be included in a turbine engine configured without a gear train. The turbine engine assembly 56 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a turbine engine, comprising:
   a combustor wall including an aperture body between a shell and a heat shield;
   the aperture body at least partially forming a cavity and an aperture that extends through the combustor wall;
   an inlet passage extending in the combustor wall to the cavity; and
   an outlet passage extending in the combustor wall from the cavity to the aperture;
   wherein the combustor wall is configured to direct air through the inlet passage to impinge against a first surface of the heat shield forming a side of the cavity;
   wherein the heat shield further includes a second surface and a third surface;
   wherein the first surface extends radially between the second surface and the third surface;
   wherein a channel extends between the aperture body and the shell, and the channel is in fluid communication with the cavity through the inlet passage; and
   wherein the channel extends axially between the shell and the heat shield, and is adjacent the aperture body; and
   wherein the aperture is configured as a quench aperture.

2. The assembly of claim 1, wherein the first surface is textured to augment convective heat transfer between the air and the combustor wall.

3. The assembly of claim 1, further comprising one or more heat transfer augmentors extending into the cavity.

4. The assembly of claim 1, wherein the aperture extends along an axis through the combustor wall, and the inlet passage extends axially to the cavity.

5. The assembly of claim 1, wherein the aperture extends along an axis through the combustor wall, and the outlet passage extends radially from the cavity to the aperture.

6. The assembly of claim 1, wherein the inlet passage is one of a plurality of inlet passages that extend in the combustor wall to the cavity.

7. The assembly of claim 1, wherein the outlet passage is one of a plurality of outlet passages that extend in the combustor wall from the cavity to the aperture.

8. The assembly of claim 1, wherein the cavity comprises an annular cavity.

9. The assembly of claim 1, wherein
   the aperture body at least partially forms a second cavity;
   a second inlet passage extends in the combustor wall to the second cavity; and
   a second outlet passage extends in the combustor wall from the second cavity to the aperture.

10. The assembly of claim 1, wherein the inlet passage is within the aperture body and/or the outlet passage is within the aperture body.

11. The assembly of claim 1, wherein the aperture is partially formed by an inner surface and a shelf surface that extends radially out to the inner surface, and the outlet passage extends to an outlet in the inner surface.

12. The assembly of claim 1, wherein
   a gap extends radially between the aperture body and the shell; and
   the channel extends axially into the aperture body and fluidly couples the gap with the inlet passage.

13. The assembly of claim 1, wherein the aperture body includes a tapered flange that partially forms the aperture through the combustor wall.

14. The assembly of claim 1, wherein the aperture body is formed integral with the heat shield.

15. The assembly of claim 1, further comprising a second combustor wall and a combustor bulkhead that extends radially between the combustor wall and the second combustor wall, wherein the combustor wall, the second combustor wall and the bulkhead form an annular combustion chamber therebetween.

16. The assembly of claim 1, wherein
   the cavity extends into the heat shield from the second surface to the first surface; and
   the aperture body is disposed on and contacts the second surface.

17. The assembly of claim 1, wherein the first surface meets the second surface at a first corner and the first surface meets the third surface at a second corner.

18. The assembly of claim 1, wherein
   the heat shield further includes a fourth surface and a fifth surface;
   the fourth surface forms a side of a cooling cavity and is contiguous with the third surface;
   the fifth surface partially forms a peripheral boundary of a combustion chamber;
   a first distance between the fifth surface and first surface is less than a second distance between the fifth surface and the fourth surface.

\* \* \* \* \*